Nov. 17, 1936.  O. VOIGT  2,061,119
COFFEE FILTER
Filed May 7, 1936
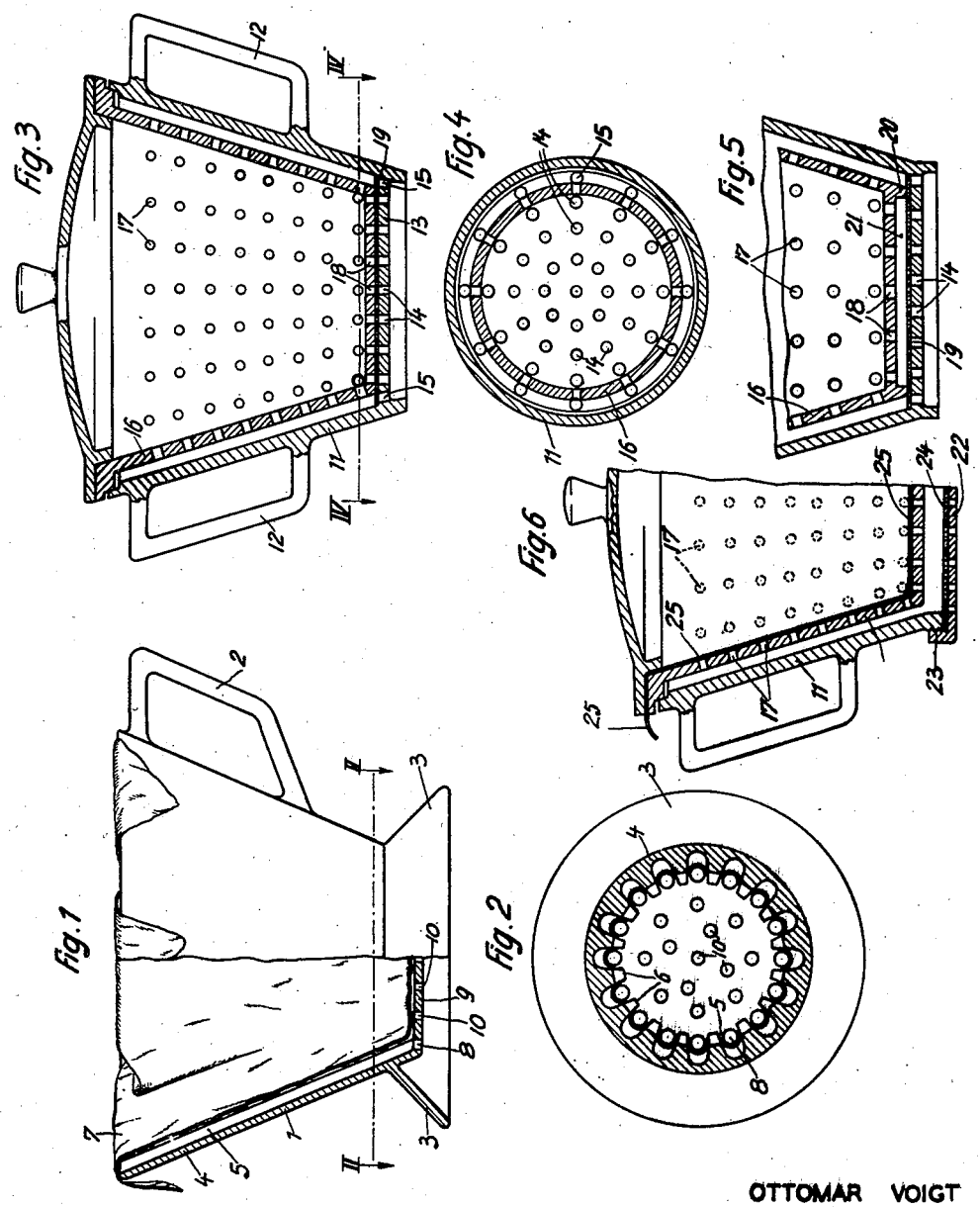
OTTOMAR VOIGT
Inventor
ATTORNEYS Patented Nov. 17, 1936

2,061,119

UNITED STATES PATENT OFFICE 2,061,119

COFFEE FILTER

Ottomar Voigt, Dusseldorf, Germany, assignor of one-half to "Blitz-Filter" G. m. b. H., Berlin, Germany Application May 7, 1936, Serial No. 78,295
In Germany December 27, 1933

4 Claims. (Cl. 210—162)

The present invention relates to improvements in coffee-filter. Filters of this class afford an agreeable use since they may, before being placed on the vessel intended for taking up the liquid filtered, be placed with their flat bottom on the table so that filter paper and ground coffee or the like can be introduced without difficulty. They are further immersed but slightly in the receiving vessel so that the latter is completely filled upon filtering.

There have been known filters of this class the inner side wall of which is provided with discharge channels and the bottom of which in the middle is provided with discharge holes. The filtrate percolating through the filter paper on the side wall flows down through the channels of the side wall and subsequently along the bottom towards the discharge holes thereof where it mixes with the filtrate obtained on the bottom. In such filters some difficulties are encountered in that the filter paper lying on the bottom interferes with the discharge of the side filtrate. Efforts have been made to obviate this inconvenience by providing the bottom of the filter vessel with ribs which keep the filter paper at some distance from the bottom. This remedy is however uncertain as the filter paper at the bottom is subject to a comparatively heavy load so that it is liable to be torn or pressed into the discharge channels formed on the bottom between the said ribs. In either case the discharge of the filtrate is more or less retarded so that filtering takes much time and the coffee cools off before it is received in the receiving vessel.

These drawbacks are obviated in the filter constructed according to the present invention inasmuch as the side and bottom filtrates are discharged separately. This result is obtained by providing the inner surface of the side wall of the filter, which is preferably of conical shape, with downward discharge channels running into discharge holes in the bottom, which are intended to receive and pass off the side filtrate only while other discharge holes are provided in the bottom for conducting away the bottom filtrate. The channels disposed on the inner surface of the filter wall may be formed by downward ribs projecting from the latter and leaving between them a plurality of channels each of which terminates into a separate bottom hole, or by grooves worked out in the plain funnel wall each of which also terminates into a separate bottom hole.

The filter according to the invention may also be composed of two parts. In this instance it comprises a shell vessel perforated in the bottom only, and an insert perforated in the bottom and in the side wall and which, between its outside and the inside of the shell, leaves a hollow space for the discharge of the side filtrate, the bottom of the insert so standing on the bottom of the shell vessel that the side and bottom filtrates are caused to flow separately through the bottom holes. A filter paper may be interposed between the bottom of the insert and the bottom of the shell vessel. A filter bag or a filter paper bag may also be interposed between the same. The bottom rim of the insert may project downwards so that a hollow space is left below the insert bottom and above the filter paper placed on the bottom of the shell vessel. This arrangement will result in a better discharge of the bottom filtrate and in an accelerated flow of the bottom filtrate through the filter paper.

If a particularly pure filtrate is to be obtained, a filter paper or a filter paper bag may be inserted into the inner vessel and an additional filter paper may be interposed between the bottom of the insert and the bottom of the shell vessel.

The two-part filter may also be made in such a way that the shell vessel is provided with a detachable perforated bottom. In this instance, the shell vessel can be used either without a bottom or with a bottom. When being used without a bottom, the filter bag or filter paper bag is inserted into the inner vessel only. When being used with a bottom a filter paper may also be placed on the bottom of the shell vessel.

The accompanying drawing represents several embodiments of the invention.

Fig. 1 shows a filter with channels in the side wall and with bottom holes, partly in section and partly in elevation.

Fig. 2 is a section on line II—II of Fig. 1.

Fig. 3 shows a vertical section of another embodiment having a shell vessel and an insert.

Fig. 4 is a section on line IV—IV of Fig. 3, and

Fig. 5 shows a vertical section of a modification of the filter according to Figs. 3 and 4.

Fig. 6 shows a part vertical section of a further embodiment of the invention which represents a filter with a shell vessel and an insert in which the shell vessel is provided with a detachable bottom.

The filter according to Figs. 1 and 2 has the shape of a cup 1 with a conical wall and with a handle 2. Near the bottom, the filter vessel is provided with a conical flange 3 which is intended for putting the filter on the receiving vessel and for placing it on the table without the underside of the filter cup being liable to pollution. On the inside of the wall 4 of the filter cup there are worked out a plurality of vertical or helical grooves 5 between which bearing surfaces 6 are left for supporting the filter paper 7. Each groove 5 opens into a hole 8 in the filter bottom 9 which is moreover provided with discharge holes 10 in any number desired.

The filter is used as follows:

At first the filter cup is placed on the table, then the filter paper is inserted and ground coffee is brought into the inside space. Subsequently the filter is put on the receiving vessel such as a coffee-pot and boiling water is poured into the filter. Now the water will trickle through the ground coffee and flow down along the side wall in the grooves 5 and directly out through the bottom holes 8 as well as through the bottoms of the filter paper and the vessel so as to leave the latter through the holes 10. Thus the bottom filtrate and the side filtrate can flow out directly without difficulty.

In the filter according to Figs. 3 and 4 the outside vessel 11 has again the shape of a cup. It is provided with a plurality of handles 12 which serve for catching and for sustaining it on the receiving vessel. The bottom 13 is provided both with discharge holes 14 regularly distributed and intended for the bottom filtrate, and with an outer circle of discharge holes 15 for the side filtrate. In the shell vessel 11 there is inserted a second vessel 16 of similar shape the wall of which is provided with holes 17 for the side filtrate while the bottom thereof is provided with holes 18 for the bottom filtrate. A sheet 19 of filter paper is interposed between the bottoms of the insert and the shell vessel respectively. Between these two vessels there may also be interposed a filter bag or filter paper bag enclosing the whole insert.

In the filter according to Fig. 3 the bottom of the insert directly rests on the bottom of the shell vessel. As is shown in Fig. 5, the insert vessel is at its bottom end provided with a projecting rim 20 so that a hollow space 21 is left above the filter paper 19. In the arrangement shown by Fig. 5 the holes 14 and 18 need not register with one another and the filtrate can flow out without hindrance independently of the particular relative angular position of the inside and outside vessels.

The embodiments shown by Figs. 3 to 5 work in the same manner as the filter of Figs. 1 and 2. The difference however consists in that the single channels of the first embodiment are replaced by a continuous hollow space encircling the filter vessel.

In the drawing, the holes 17 and 18 of the inner vessel are represented on an exaggerated scale. Particularly in case no filter paper is used on the bottom or in the whole, the holes must be so small that the ground coffee is prevented from penetrating through them.

The filter constructed in accordance with Figs. 3 to 6 is easier to manufacture than the filter provided with ribs or grooves according to Fig. 1, and more readily cleaned. On the other hand, however, it requires two vessels. This is in part compensated by the possible economy in filter paper since, in case filter paper is used, a small filter paper on the bottom will be sufficient.

Fig. 6 shows a further modification of the filter designed according to Figs. 3 and 4. The insert 16 has not been modified, but is freely suspended in the shell vessel. The shell vessel 11 however is provided with a detachable perforated bottom 22 which can be screwed on the shell vessel by means of the thread 23 or be secured thereto in any other manner. On the bottom 22 a filter paper 24 may be placed. This can be used alone or in combination with a filter bag or filter paper bag 25 placed into the insert. The filter paper 24 may also be dispensed with. This embodiment affords the advantage that in the case of a single filtration the bottom 22 may be detached so that the bottom and side filtrates are allowed to run out quickly in a downward direction. On account of the very large number of holes 17 of the insert, the side filtrate will flow out therefrom readily and quickly even if no channels are provided in the inside walls of the insert. This embodiment is particularly suited for large filters. However, a large number of channels must then be provided to prevent the spacing between the channels from being too large.

What I claim, is—

1. A filtering vessel for coffee or the like comprising an imperforate outer wall, means for removably supporting said vessel upon a receiving vessel so that the major portion of said wall is located above and outside of said receiving vessel, a plurality of channels at the inside of said wall, and a bottom, said channels extending downwardly and through said bottom and having openings at their lower ends whereby when a filtering layer is inserted in said filtering vessel adjacent said channels and a fluid is filtered through said layer, the filtrate flowing downwardly through said channels passes off quickly through said channel openings.

2. A filtering vessel according to claim 1, said wall being of frusto-conical shape, said channels extending in downward direction, said bottom having perforations spaced from said wall, whereby the filtrates flowing through said channels and the filtrates flowing through the bottom of said filtering layer are passed off separately.

3. A filtering vessel according to claim 1, said wall being of frusto-conical shape, the spaces intermediate adjacent channels forming radially inwardly projecting ribs adapted for supporting said filtering layer, said channels and ribs extending in downward direction, said bottom being flat and having perforations spaced from said wall, whereby the filtrates flowing through said channels and the filtrates flowing through the bottom of said filtering layer are passed off separately.

4. A filtering vessel for coffee or the like comprising an imperforate outer wall, an outwardly extending flange on said wall near the lower end thereof but spaced therefrom and adapted to support said vessel upon a receiving vessel removably, downwardly extending ribs at the inside of said wall adapted for supporting a filtering layer thereon, said ribs forming channels therebetween for passing off the filtrate flowing through the sides of said filtering layer, and a bottom having a plurality of perforations therein adjacent said wall, said channels terminating directly into said perforations, and other perforations spaced from said wall whereby when a fluid is filtered through said layer the filtrates flowing through the sides of said layer and downwardly through said channels and the filtrates flowing through the bottom of said filtering layer are passed off separately.

OTTOMAR VOIGT.